INVENTORS.
Raymond F. Pitman
Dean E. Broderson
Herbert W. Gronemeyer Jr.
BY
ATTORNEYS.

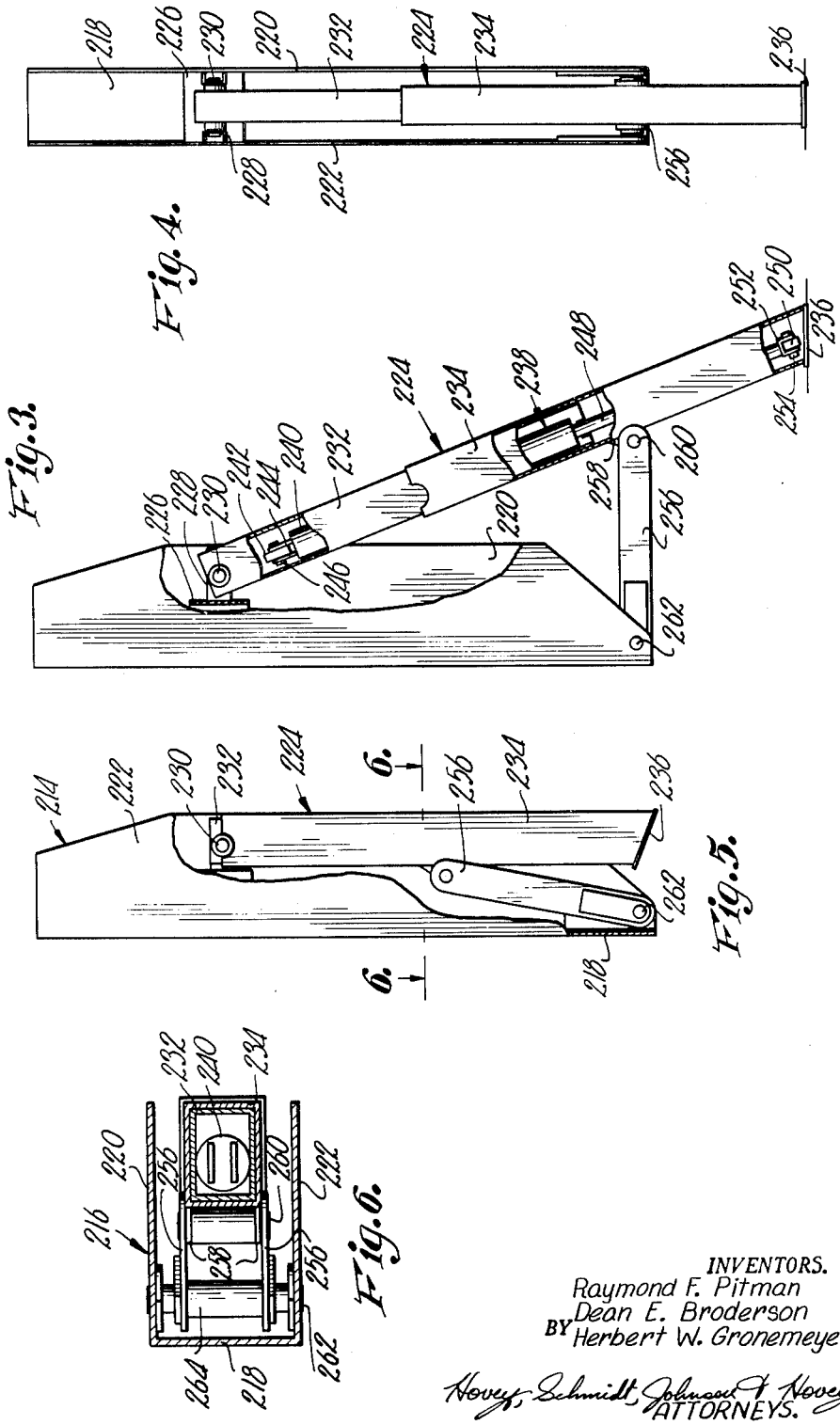

United States Patent Office 3,262,582
Patented July 26, 1966

3,262,582
OUTRIGGER STRUCTURE FOR HOLE DIGGER
AND DERRICK APPARATUS
Raymond F. Pitman, Prairie Village, Kans., and Dean E.
Broderson and Herbert W. Gronemeyer, Jr., Kansas
City, Mo., assignors to Pitman Manufacturing Company, Grandview, Mo., a corporation of Missouri
Original application Nov. 28, 1960, Ser. No. 72,027.
Divided and this application May 4, 1964, Ser.
No. 364,736
6 Claims. (Cl. 212—145)

This is a division of our copending application Serial No. 72,027, filed November 28, 1960, and entitled, "Hole Digger and Derrick Apparatus."

This invention relates to an outrigger assembly adapted to be mounted on a mobile vehicle such as a utility vehicle, as for example a hydraulic digger and a derrick.

An important object of the invention is to provide an improved outrigger for a utility type vehicle and which is operated by a single hydraulic cylinder which functions to not only extend the leg of the outrigger, but to also swing the latter away from the truck into supporting relationship to the boom structure in response to actuation of the cylinder.

Another important object of the invention is to provide an outrigger which employs only one hydraulic cylinder and piston assembly for moving an extensible outrigger leg from a folded, stowed position within the housing therefor on the vehicle body, to an extended, ground-engaging disposition at an angle with respect to the vertical.

Other important objects and details of construction of the present unit will be described in greater detail or become obvious as the following specification progresses.

In the drawings:

FIG. 3 is a side elevational view of the outrigger assembly per se and with certain parts thereof being broken away and in section to reveal details of construction of the same;

FIG. 4 is a side elevational view of the outrigger as shown in FIG. 3;

FIG. 5 is a side elevational view similar to FIG. 3, but with the extensible leg of the outrigger being in retracted position; and FIG. 6 is an enlarged, horizontal, cross-sectional view taken on line 6—6 of FIG. 5 and looking downwardly.

Figure 1:
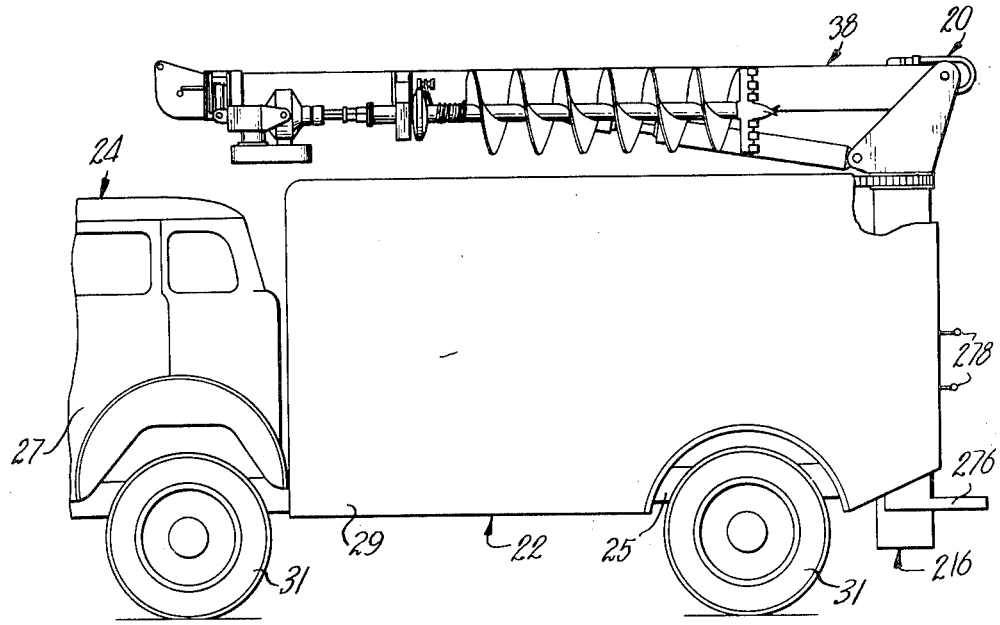
FIGURE 1 is a fragmentary, side elevational view of a line truck having a hoisting unit combining the functions of a hydraulic digger and a derrick mounted on one rear corner of the truck body and shown in the stowed position thereof in direct overlying relationship to the truck, certain parts of the equipment being broken away to reveal details of the elements therebehind.
Figure 2:
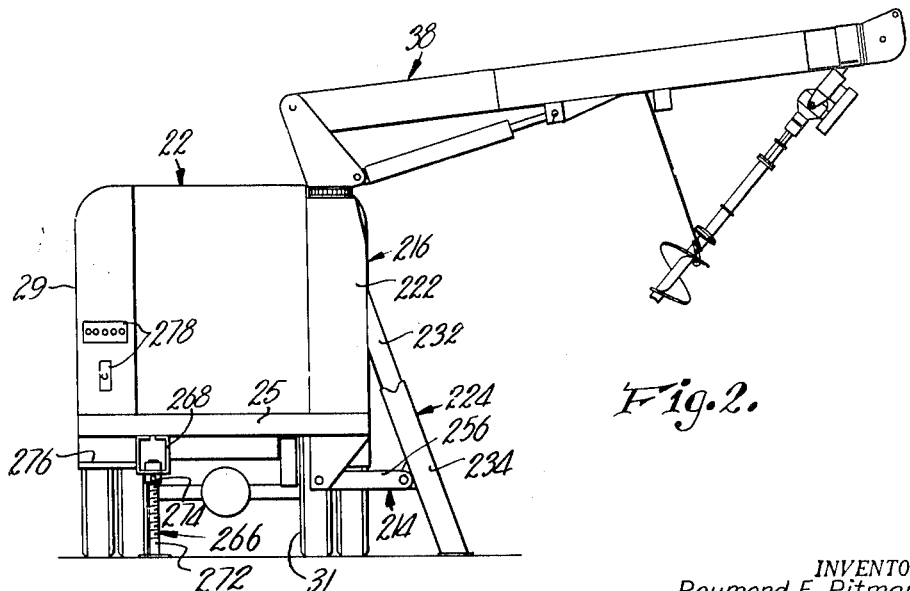
FIG. 2 is a rear elevational view on reduced scale of the vehicle, shown in FIG. 1 and illustrating the position of the boom when projecting outwardly from the truck frame, the location of the outrigger assembly in extended condition, and the way in which the auger is moved to the operable position thereof from the stowed disposition of the same as shown in FIG. 1.

The outrigger assembly of the present invention and broadly designated 214, is adapted to be mounted on body 22 of utility vehicle 24 in direct alignment with a hydraulic digger and derrick unit 20 thereon having boom structure 38. Vehicle 24 has a frame 25 supported by a pair of spaced wheel and axle units 31 and carrying body components 22 in the nature of a cab 27 and storage compartment and bed assembly 29. Outrigger assembly 214 may for example be mounted on the rear right-hand corner of body 22 and includes an upright housing 216 which is of generally outwardly-facing, U-shaped configuration provided with a vertical rear wall 218 and a pair of opposed side walls 220 and 222 presenting a space therebetween for receiving the extensible outrigger leg 224 as shown in FIG. 5. A bracket unit 226 mounted within housing 216 adjacent the upper end thereof, mounts connector means 228, in turn carrying a horizontal pin 230 rotatably receiving the upper extremity of a tubular, transversely rectangular leg section 232 forming a part of extensible leg 224. The lowermost leg section 234 telescoped over and complemental with section 232, is beveled at the lower extremity thereof and receives a bearing plate 236 which is disposed to complementally engage the ground when extensible leg 224 is in the extended position thereof as shown in FIG. 3. A hydraulic cylinder assembly 238 within extensible leg 224, is provided with a cylinder 240 connected to cross member 242 within section 232 adjacent the upper end thereof, by ear means 244 secured to cross member 242 by pin means 246. The piston 248 of assembly 238 is joined to a cross member 250 at the lower extremity of section 234 by U-coupling 252 connected to cross member 250 by pin means 254.

A pair of parallel links 256 are pivotally joined to lugs 258 secured to the normally rearmost face of section 234 intermediate the ends thereof, by pin means 260, while the opposite ends of the links 256 are swingably connected to the lower ends of corresponding side walls 220 and 222 of housing 216 by pin means 262. A sleeve 264 surrounding pin means 262, interposed between links 256 and secured to the latter, maintains the same in proper spaced relationship.

An additional support may be provided for body 22 during operation of boom structure 38, and the same preferably includes hydraulically operated jack means 266 which includes a bracket 268 secured to the frame 270 of body 22, as well as a vertically shiftable ground-engaging member 272 and movable in response to control means forming a part of the hydraulic system of vehicle 24. The opposite side jack 266 provides stability for boom structure 38 during cross-body operation thereof.

A horizontal step 276 located at the left rear corner of body 22, permits the operator of boom structure 38 to have ready access to the controls 278 for the hydraulic components of unit 20, and outrigger assembly 210, as well as jack means 266, and in a position where he can see the disposition of all of the parts of boom structure 38.

The combination digger-derrick vehicle 24 is especially adapted for use in the erection and maintenance of electrical transmission lines, as for example in the setting of line poles.

Vehicle 24 is driven onto the shoulder of the road adjacent the point where it is desired to dig a hole for receiving a utility pole or similar article, and the operator climbs up on step 276 so that he may operate the controls 278. Initially, the control for assembly 238 is operated to thereby cause hydraulic fluid to be directed into cylinder 240 in a direction to force piston 248 outwardly. Extension of piston 248 moves section 234 outwardly with respect to section 232, whereby the links 256 force leg 224 away from and out of housing 216 with the plate 236 moving into engagement with the ground when links 256 are in a substantially horizontal plane. In this position, the extensible leg 224 serves to stabilize the vehicle during use and operation of digger-derrick unit 20.

The outrigger assembly is retracted by shifting piston rod 248 of cylinder assembly 238 inwardly into cylinder 240, whereby section 234 telescopes over section 232 to effect swinging of leg 224 into the housing 216 as links 256 are caused to swing upwardly into the location thereof illustrated in FIG. 5.

An especially important advantage of the present outrigger assembly is the disposition of cylinder 240 within tubular leg sections 232 and 234 so that rod 248, as well as the couplings at opposed ends of cylinder 240, are protected at all times against objects striking the same. The present construction virtually eliminates problems associated with damage to the outrigger piston and cylinder unit because of poles and other objects striking the outrigger during operation of the hoisting derrick forming a part of the present mechanism.

Having thus described the invention what is claimed as new and desired to be secured by Letters Patent is:

1. For use on a vehicle having a frame and body structure carried by at least a pair of spaced wheel and axle units, the combination with said structure of an outrigger having:
   an elongated, tubular, extensible leg having an upper leg section and a lower leg section disposed in relatively reciprocable, telescoped relationship;
   a piston and cylinder assembly within the leg with the piston thereof being joined to one of the leg sections and the cylinder being coupled to the other leg section whereby extension and retraction of the piston causes corresponding relative reciprocation between the leg sections;
   first pivot means pivotally joining the upper extremity of the upper leg section to the structure at an elevation substantially above the level of the vehicle axles;
   non-extensible link means pivotally connected to the lower leg section intermediate the ends of the piston and cylinder assembly within said leg; and
   second pivot means pivotally mounting the link means on the structure in disposition below the level of said first pivot means but not substantially below said level of the axles of the vehicle, the effective length of said link means being not significantly greater than the stroke of the piston of said assembly and said link means being pivotally joined to said lower leg section at a location causing the leg to be in substantially upright disposition adjacent the structure with the pivot axis of the connection of the link means to the leg being located outwardly of the structure with respect to a line between said first and second pivot means when the piston is retracted whereby upon extension of the piston, the lower extremity of said lower leg is moved outwardly and downwardly into engagement with the ground under the control of said link means.

2. The combination of claim 1 wherein the lower leg is of a length to cause the lower ground-engaging extremity thereof to be located substantially at the level of said second pivot means when the piston is retracted and the leg is in the substantially upright disposition thereof.

3. The combination of claim 1 wherein said link means if of a length to cause the same to be in substantially horizontal disposition when the piston is extended to an extent to bring the lower extremity of the lower leg section into engagement with the ground in stabilizing relationship to the vehicle.

4. The combination of claim 1 wherein is provided an upright housing mounted on the structure in alignment with said leg and having an elongated vertical recess therein for receiving said leg when the latter is in the retracted position thereof.

5. The combination of claim 4 wherein said leg sections and the link means are of effective lengths causing the members to be located in generally vertical disposition when retracted and at approximately a 30° angle when extended.

6. For use on a vehicle having a frame and body structure carried by at least a pair of spaced wheel and axle units, the combination with said structure of an outrigger having:
   an elongated, tubular, extensible leg having an upper leg section and a lower leg section disposed in relatively reciprocable, telescoped relationship;
   first pivot means pivotally joining the upper extremity of the upper leg section to the structure at an elevation substantially above the level of the vehicle axles;
   power means within the leg and connected to the upper and lower leg sections for shifting the lower leg section relative to the upper leg section;
   non-extensible link means pivotally connected to the lower leg section in substantial spaced relationship from the lowermost extremity of said lower leg section;
   second pivot means pivotally mounting the link means on the structure in disposition below the level of said first pivot means but not substantially below said level of the axles of the vehicle, said link means being pivotally joined to said lower leg section at a location causing the leg to be in substantially upright disposition adjacent the structure with the pivot axis of the connection of the link means to the leg being located outwardly of the structure with respect to a line between said first and second pivot means when the leg is in said substantially upright disposition, and the effective length of said link means being not significantly greater than the normal extent of reciprocable movement of the lower leg section whereby upon movement of the lower leg section away from the upper leg section, the lower extremity of said lower leg is moved outwardly and downwardly into engagement with the ground under the control of said link means.

References Cited by the Examiner

UNITED STATES PATENTS

| | | | |
|---|---|---|---|
| 1,925,827 | 9/1933 | Williams | 280—150.5 |
| 2,264,382 | 12/1941 | Keller | 217—60 |
| 2,452,632 | 11/1948 | Cameron | 212—145 X |
| 3,021,016 | 2/1962 | Noll et al. | 212—145 |

EVON C. BLUNK, *Primary Examiner.*

SAMUEL F. COLEMAN, *Examiner.*

A. L. LEVINE, A. H. NIELSEN, *Assistant Examiners.*